US012634067B2

(12) United States Patent
Wang et al.

(10) Patent No.: US 12,634,067 B2
(45) Date of Patent: May 19, 2026

(54) SRS TRANSMISSION METHOD, DEVICE AND SYSTEM, STORAGE MEDIUM, AND ELECTRONIC DEVICE

(71) Applicant: ZTE Corporation, Shenzhen (CN)

(72) Inventors: Yuxin Wang, Shenzhen (CN); Zhaohua Lu, Shenzhen (CN); Hao Wu, Shenzhen (CN); Chuangxin Jiang, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 503 days.

(21) Appl. No.: 17/915,615

(22) PCT Filed: Apr. 6, 2021

(86) PCT No.: PCT/CN2021/085727
§ 371 (c)(1),
(2) Date: Sep. 29, 2022

(87) PCT Pub. No.: WO2021/208779
PCT Pub. Date: Oct. 21, 2021

(65) Prior Publication Data
US 2023/0136464 A1 May 4, 2023

(30) Foreign Application Priority Data

Apr. 14, 2020 (CN) .......................... 202010292437.2

(51) Int. Cl.
*H04L 5/00* (2006.01)
(52) U.S. Cl.
CPC .......... *H04L 5/0048* (2013.01); *H04L 5/0094* (2013.01)

(58) Field of Classification Search
CPC ... H04L 5/0048; H04L 5/0094; H04L 5/0012; H04L 5/0023; H04L 5/0073;
(Continued)

(56) References Cited

U.S. PATENT DOCUMENTS

2018/0076946 A1    3/2018  Li et al.
2020/0083997 A1*   3/2020  Takata .................. H04L 5/0062
(Continued)

FOREIGN PATENT DOCUMENTS

CN          101330325 A      12/2008
CN          102223726 A      10/2011
(Continued)

OTHER PUBLICATIONS

3GPP TSG RAN WGI Meeting #98bis (Oct. 14-20, 2019) (Year: 2019).*
(Continued)

*Primary Examiner* — Rebecca E Song
(74) *Attorney, Agent, or Firm* — CANTOR COLBURN LLP

(57) ABSTRACT

A Sounding Reference Signal (SRS) transmission method, device and system, a storage medium, and an electronic device are provided. The method includes: receiving configuration information sent by a first communication node via signaling, and transmitting an SRS to the first communication node based on the configuration information; or, transmitting an SRS to a first communication node according to a rule agreed upon with the first communication node.

13 Claims, 7 Drawing Sheets

Send configuration information to a second communication node via signaling, and receive an SRS transmitted by the second communication node based on the configuration information; or receive an SRS transmitted by the second communication node according to a rule agreed upon with the second communication node ⟍ S802

(58) Field of Classification Search

CPC ....... H04L 5/0051; H04B 1/713; H04B 1/715; H04B 2001/7154

See application file for complete search history.

(56) References Cited

U.S. PATENT DOCUMENTS

| | | | | |
|---|---|---|---|---|
| 2020/0244334 A1* | 7/2020 | Huang | ................. | H04W 72/046 |
| 2020/0280404 A1* | 9/2020 | Qin | ....................... | H04L 5/0048 |
| 2020/0403749 A1* | 12/2020 | Park | ...................... | H04L 5/0048 |
| 2021/0075646 A1* | 3/2021 | Yum | .................... | H04B 1/7143 |

FOREIGN PATENT DOCUMENTS

| | | | |
|---|---|---|---|
| CN | 108111282 | A | 6/2018 |
| CN | 108768599 | A | 11/2018 |
| CN | 109995491 | A | 7/2019 |
| CN | 110535595 | A | 12/2019 |
| CN | 110650001 | A | 1/2020 |
| CN | 111865545 | A | 10/2020 |
| EP | 3734884 | A1 | 11/2020 |
| WO | 2018126361 | A1 | 7/2018 |
| WO | 2019096244 | A1 | 5/2019 |
| WO | 2019135651 | A1 | 7/2019 |

OTHER PUBLICATIONS

3GPP TSG RAN WG1 Meeting AH 1801 (Jan. 22-26, 2018), (Year: 2018).*

International Search Report for corresponding application PCT/CN2021/085727 filed Apr. 6, 2021; Mail date Jul. 14, 2021.

Ericsson, "Maintenance for additional SRS symbols", 3GPP TSG-RAN WG1 Meeting #100-e, Online, Feb. 24-Mar. 6, 2020, R1-2000942.

Huawei, HiSilicon, "SRS design for NR positioning", 3GPP TSG RAN WG1 Meeting #98bis, Chongqing, China, Oct. 14-20, 2019, R1-1910034.

ZTE, Sanechips, "Remaining details on SRS", 3GPP TSG RAN WG1 Meeting AH 1801, Vancouver, Canada, Jan. 22-26, 2018, R1-1800116.

European search report, BNT129619EPPC, App. 21787726.5;PCTD/CN2021085727, Dated Sep. 26, 2023 8 pages.

Lang Weimin et al; "Research on LTE TDD working mode" [English Abstract included] Telecom Express, Issue 05, May 10, 2023.

Chinese Office Action for corresponding application 202010292437.2; Report dated Jan. 19, 2025.

* cited by examiner

Input/Output device 108

Transmitting device 106

Processor 102

Memory 104

Receive configuration information sent by a first communication node via signaling, and transmit an SRS to the first communication node based on the configuration information; or, transmit an SRS to a first communication node according to a rule agreed upon with the first communication node

Figures 8, 9, 10:
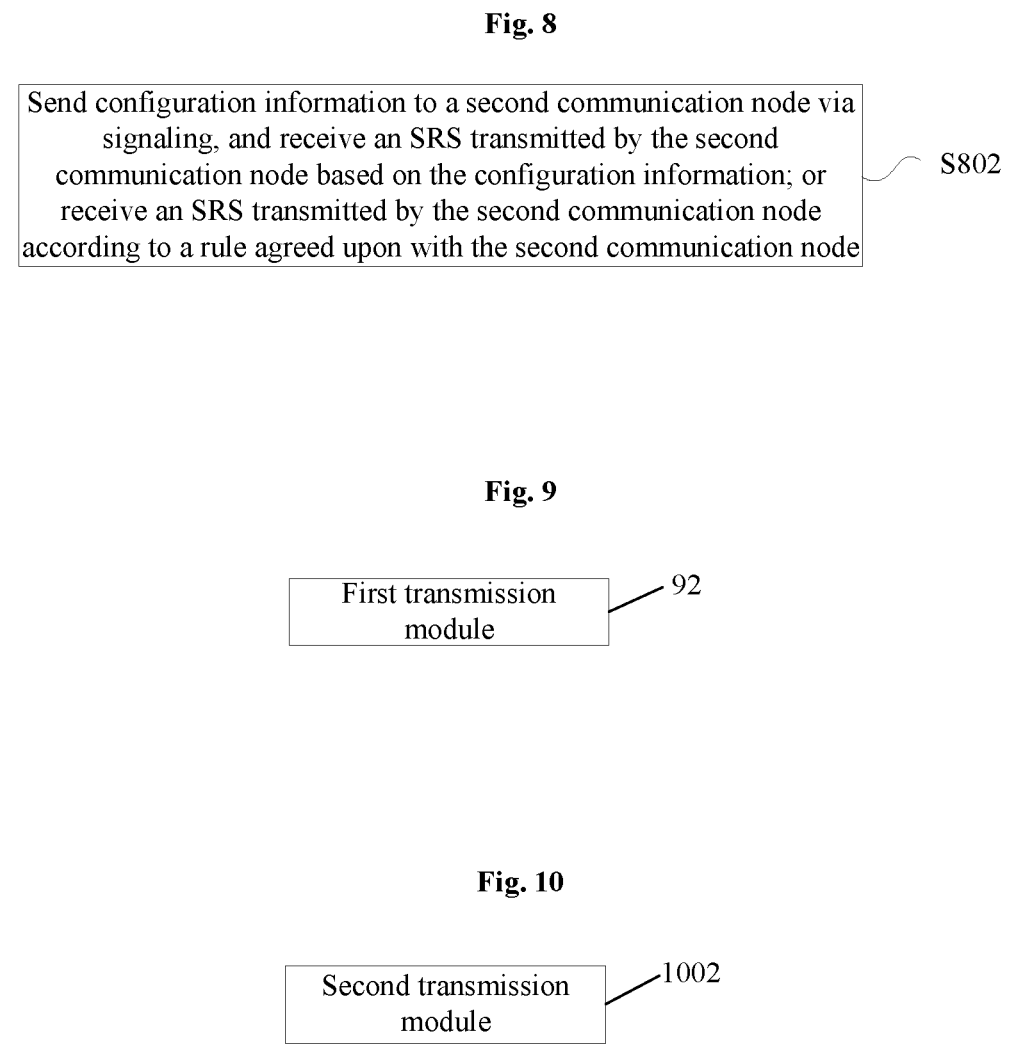

| |
|---|
| Send configuration information to a second communication node via signaling, and receive an SRS transmitted by the second communication node based on the configuration information; or receive an SRS transmitted by the second communication node according to a rule agreed upon with the second communication node |

| First transmission module |
|---|

| Second transmission module |
|---|

⟋ 1002

SRS TRANSMISSION METHOD, DEVICE AND SYSTEM, STORAGE MEDIUM, AND ELECTRONIC DEVICE

CROSS REFERENCE

This application is a National Stage Filing of the PCT International Application No. PCT/CN2021/085727 filed on Apr. 6, 2021, which claims priority to Chinese Application No. 202010292437.2 filed on Apr. 14, 2020, the entirety of which is herein incorporated by reference.

TECHNICAL FIELD

The present disclosure relates to the field of communications, and in particular to a Sounding Reference Signal (SRS) transmission method, device and system, a storage medium, and an electronic device.

BACKGROUND

In Long Term Evolution (LTE), a Physical Downlink Control Channel (PDCCH) is used for bearing Downlink Control Information (DCI), wherein the DCI may include uplink scheduling information, downlink scheduling information and uplink power control information. The DCI formats include DCI format 0, 1, 1A, 1B, 1C, 1D, 2, 2A, 3, 3A, etc., and further include DCI format 2B, 2C and 2D in the further evolved LTE-A Release 12 (LTE-A release 12) to support a variety of different applications and transmission modes. A first communication node (for example, an e-Node-B (eNB)) may configure a second communication node (for example, a User Equipment (UE)) through downlink control information, or the second communication node receives higher-layer configuration, in other words, the UE is configured through higher-layer signaling. The first communication node may be a base station of a macro cell, a base station or a transmission node of a small cell, a sending node in a high-frequency communication system, a sending node in an Internet of Things (IoT) system, a satellite node, or the like. The second communication node may be a node in a communication system, such as a UE, a mobile phone, a portable device, an automobile, or a satellite node.

A Sounding Reference Signal (SRS) is a signal used for measuring Channel State Information (CSI) between a second communication node and a first communication node. In a long term evolution system, a UE regularly transmits an uplink SRS on the last data symbol of a transmission subframe according to parameters, such as a frequency band, a frequency domain position, a sequence cyclic shift, a period and a subframe offset, which are indicated by an eNB. The eNB determines uplink CSI of the UE according to the received SRS, and performs operations, such as frequency domain selective scheduling and closed loop power control, according to the determined CSI.

In the study of LTE-A Release 10, it is proposed that in uplink communication, a non-precoded SRS (i.e., an antenna-specific SRS) should be used; while a De Modulation Reference Signal (DMRS) for demodulation of a Physical Uplink Shared Channel (PUSCH) should be precoded. The first communication node can estimate an original uplink CSI based on the received non-precoded SRS, but the first communication node cannot estimate the original uplink CSI based on the precoded DMRS. In this case, when the UE uses multiple antennas to transmit non-precoded SRSs, the SRS resources required by each UE are increased, thereby reducing the number of UEs that can be multiplexed simultaneously in the system. The UE may transmit the SRS in two triggering manners, i.e., higher-layer signaling (also referred to as triggering by trigger type 0) or downlink control information (also referred to as triggering by trigger type 1), wherein periodic SRSs are triggered based on the higher-layer signaling, and aperiodic SRSs are triggered based on the downlink control information. In the LTE-A Release 10, an aperiodic transmission manner for the SRSs is added, so that the utilization rate of an SRS resource is improved to some extent, and the flexibility of resource scheduling is improved.

In the study of Rel-15 NR (New Radio Access), the SRS is mainly used for the purposes of beam management, codebook-based, non-codebook-based, and antenna switching.

In the study of Rel-17 NR (New Radio Access), how to further enhance the coverage area and multiplexing capacity of the SRS and reduce interference to adjacent cells remains to be solved.

It can be seen from the above introduction that there are problems in the related art that a coverage range and a multiplexing capacity of the SRS are small and interference is caused to adjacent cells.

Aiming at the described problems existing in the related art, no effective solution has been proposed at present.

SUMMARY

Provided are an SRS transmission method, device and system, which can at least solve the problems in the related art that a coverage range and a multiplexing capacity of the SRS are small and interference is caused to adjacent cells.

According to an embodiment of the present disclosure, provided is an SRS transmission method, including: receiving configuration information sent by a first communication node via signaling, and transmitting an SRS to the first communication node based on the configuration information; or, transmitting an SRS to a first communication node according to a rule agreed upon with the first communication node.

According to another embodiment of the present disclosure, provided is an SRS transmission method, including: sending configuration information to a second communication node via signaling, and receiving an SRS transmitted by the second communication node based on the configuration information; or, receiving an SRS transmitted by a second communication node according to a rule agreed upon with the second communication node.

According to another embodiment of the present disclosure, provided is a first SRS transmission device, including: a first transmission module, configured to receive configuration information sent by a first communication node via signaling, and transmit an SRS to the first communication node based on the configuration information; or transmit an SRS to a first communication node according to a rule agreed upon with the first communication node.

According to another embodiment of the present disclosure, provided is a second SRS transmission device, including: a second transmission module, configured to send configuration information to a second communication node via signaling, and receive an SRS transmitted by the second communication node based on the configuration information; or receive an SRS transmitted by a second communication node according to a rule agreed upon with the second communication node.

According to another embodiment of the present disclosure, provided is an SRS transmission system, including a first communication node and a second communication node, wherein the first communication node includes the first SRS transmission device described in the described embodiment, and the second communication node includes the second SRS transmission device described in the described embodiment.

According to another embodiment of the present disclosure, provided is a computer-readable storage medium. The computer-readable storage medium stores a computer program, wherein the computer program is configured to execute the operations in any one of the method embodiments at runtime.

According to another embodiment of the present disclosure, provided is an electronic device, including a memory and a processor, wherein the memory stores a computer program, and the processor is configured to run the computer program so as to execute the operations in any one of the method embodiments.

By means of the solution provided in the embodiments of the present disclosure, an SRS is transmitted based on configuration information sent via signaling, or the SRS is transmitted according to a rule agreed upon, so that the coverage range and the multiplexing capacity of the SRS can be enhanced. In this way, the problems in the related art that the coverage range and the multiplexing capacity of the SRS are small and interference is caused to adjacent cells can be solved, thereby achieving the effects of enhancing the coverage range and the multiplexing capacity of the SRS and reducing the interference to the adjacent cells.

BRIEF DESCRIPTION OF THE DRAWINGS

FIG. 8 is a second flowchart of an SRS transmission method according to an embodiment of the present disclosure;

FIG. 9 is a first structure diagram of an SRS transmission device according to an embodiment of the present disclosure;

FIG. 10 is a second structure diagram of an SRS transmission device according to an embodiment of the present disclosure.

DETAILED DESCRIPTION

Hereinafter, the present disclosure will be described in detail with reference to the accompanying drawings and embodiments.

It should be noted that, terms such as "first" and "second" in the description, claims, and accompanying drawings of the present disclosure are used to distinguish similar objects, but are not necessarily used to describe a specific sequence or order.

Figures 1, 2:
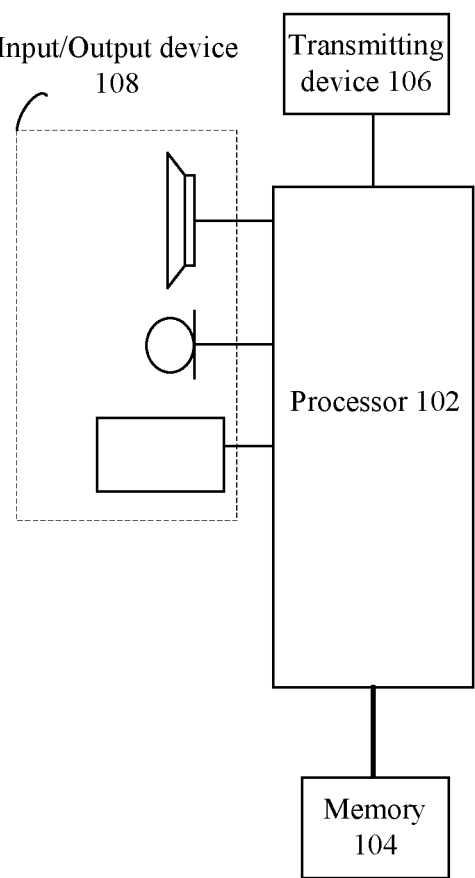
FIG. 1 is a block diagram of the hardware structure of a mobile terminal for transmitting an SRS according to the embodiments of the present disclosure.
FIG. 2 is a first flowchart of an SRS transmission method according to an embodiment of the present disclosure.

The method embodiments provided in the embodiments of the present disclosure may be executed in a mobile terminal, a computer terminal, or a similar computing device. Taking the operation on a mobile terminal as an example, FIG. 1 is a block diagram of the hardware structure of a mobile terminal for transmitting an SRS according to the embodiments of the present disclosure. As shown in FIG. 1, the mobile terminal may include one or more (only one is shown in FIG. 1) processors 102 (the processor 102 may include, but are not limited to, a Micro Controller Unit (MCU) or a processing device such as a Field Programmable Gate Array (FPGA)) and a memory 104 configured to store data. The mobile terminal may further include a transmitting device 106 configured to perform a communication function and an input/output device 108. A person having ordinary skill in the art can understand that the structure shown in FIG. 1 is merely exemplary, which does not limit the structure of the foregoing mobile terminal. For example, the mobile terminal may further include more or fewer components than shown in FIG. 1, or have a different configuration from that shown in FIG. 1.

The memory 104 may be configured to store a computer program, for example, a software program and a module of application software, such as a computer program corresponding to the SRS transmission method in the embodiments of the present disclosure. The processor 102 runs the computer program stored in the memory 104, so as to execute various function applications and data processing, that is, to implement the foregoing method. The memory 104 may include high-speed random access memory, and may also include non-volatile memory, such as one or more magnetic storage devices, flash memory, or other non-volatile solid-state memory. In some instances, the memory 104 may further include one or more memories remotely located with respect to the one or more processors 102, and the one or more memories may be connected to the mobile terminal over a network. Examples of such network include, but are not limited to, the Internet, an intranet, a local area network, a mobile communication network, and combinations thereof.

The transmitting device 106 is configured to receive or transmit data via a network. Specific examples of the described network may include a wireless network provided by a communication provider of the mobile terminal. In one example, the transmitting device 106 may include a Network Interface Controller (NIC) that may be coupled to other network devices via a base station to communicate with the Internet. In one example, the transmitting device 106 may be a Radio Frequency (RF) module configured to communicate with the Internet wirelessly.

An SRS transmission method is provided in an embodiment of the present disclosure. FIG. 2 is a first flowchart of an SRS transmission method according to an embodiment of the present disclosure. As shown in FIG. 2, the method includes the following operation.

At S202, configuration information sent by a first communication node via signaling is received, and an SRS is transmitted to the first communication node based on the configuration information; or an SRS is transmitted to a first communication node according to a rule agreed upon with the first communication node.

In the foregoing embodiment, the transmitted SRS may be a partial frequency hopping SRS. The partial frequency hopping SRS can accelerate a speed at which the base station obtains the channel information, and can also avoid services of other users in a frequency domain, thereby reducing interference to other users. In addition, partial frequency hopping with repetition can be used to enhance the coverage of the SRS. The first communication node may be a base station of a macro cell, a base station or a transmission node of a small cell, a sending node in a high-frequency communication system, a sending node in an Internet of Things system, a satellite node, etc.

The execution entity of the foregoing operations may be a second communication node, for example, a user equipment (UE), including but not limited to a mobile phone, a portable device, or the like, and may also be a node in a communication system such as a vehicle-mounted terminal or a satellite node.

By means of the embodiment of the present disclosure, an SRS is transmitted based on configuration information sent via signaling, or the SRS is transmitted according to a rule agreed upon, so that the coverage range and the multiplexing capacity of the SRS can be enhanced. In this way, the problems in the related art that the coverage range and the multiplexing capacity of the SRS are small and interference is caused to adjacent cells can be solved, thereby achieving the effects of enhancing the coverage range and the multiplexing capacity of the SRS and reducing interference to the adjacent cells.

Figure 3:
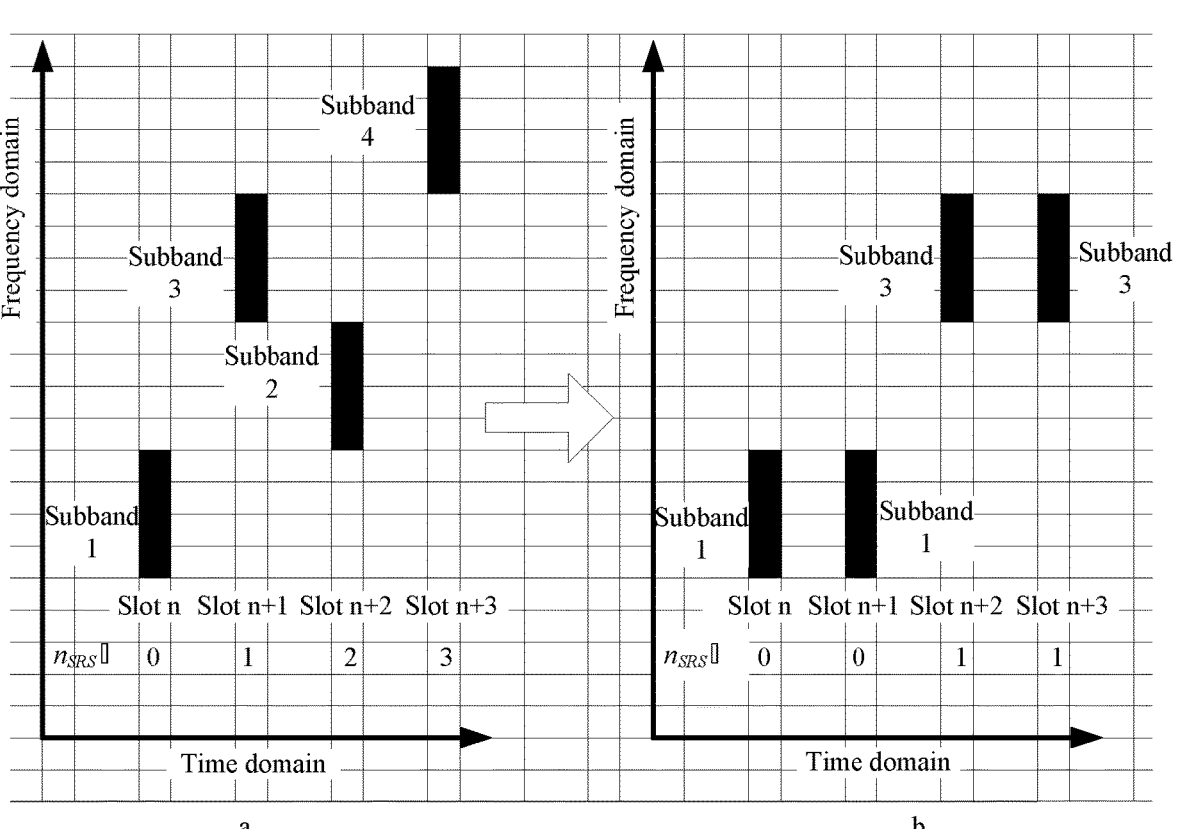
FIG. 3 is a schematic diagram of repeatedly transmitting an SRS by using respective subbands in a plurality of subbands according to an embodiment of the present disclosure.

In an exemplary embodiment, the signaling includes at least one of: information for indicating the number of times that a periodic SRS or a semi-persistent SRS is repeatedly transmitted in a time domain or between slots; information for indicating the number of times that an SRS resource set is repeatedly transmitted in a time domain or between slots; information for indicating a full-hop bandwidth within which an aperiodic SRS is not detected; information for indicating to transmit the SRS at a frequency domain position the same as a frequency domain position in a previous time domain transmission unit; information for indicating to transmit the SRS at a frequency domain position the same as a frequency domain position in a next time domain transmission unit; and information for indicating hopping or randomization of a transmission comb of the SRS among SRS resources. In the present embodiment, in a case where the SRS to be transmitted is a partial frequency hopping SRS and the information, included in the signaling, for indicating the number of times that the periodic SRS or the semi-persistent SRS is repeatedly transmitted in the time domain or between the slots is equal to 2, a schematic diagram of repeatedly transmitting the SRS by using respective subbands in a plurality of subbands may refer to FIG. 3. As shown in FIG. 3, region a in FIG. 3 is used to illustrate that frequency hopping is performed for subband 1 to subband 4 in a frequency domain, so that as shown in region b in FIG. 3, the SRS is repeatedly transmitted twice on subband 1, the SRS is repeatedly transmitted twice on subband 3, and $n_{SRS}$ (the SRS transmission number) is accumulated and counted according to a rule of 0, 0, 1, 1, . . . .

Figure 4:
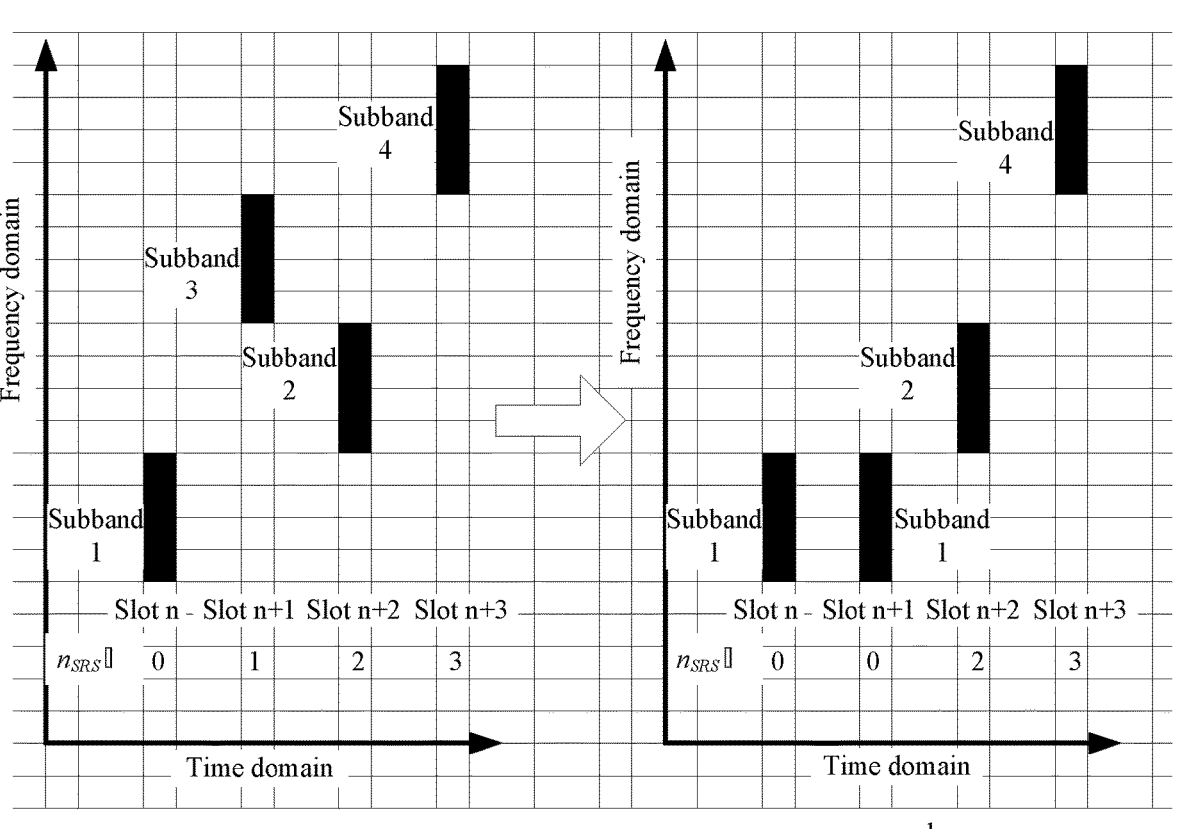
FIG. 4 is a schematic diagram of updating a frequency domain position of an SRS in a current time domain position to a frequency domain position corresponding to a previous time domain position at which the SRS is transmitted according to an embodiment of the present disclosure.
Figure 5:
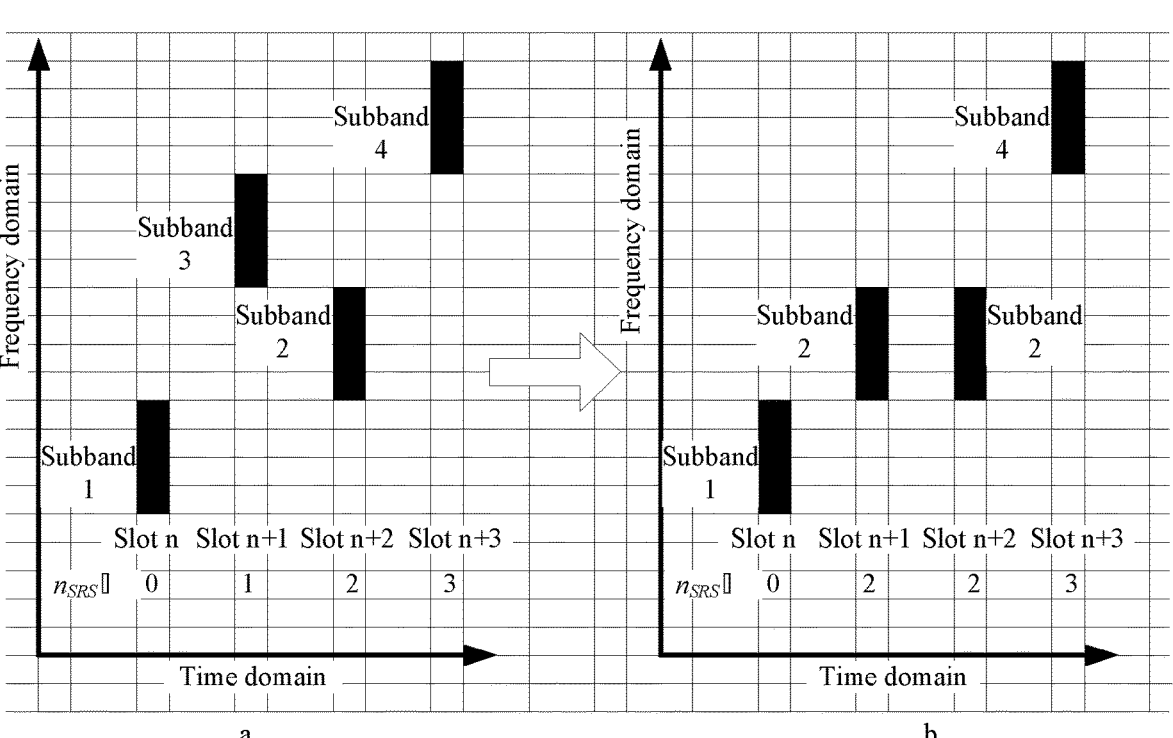
FIG. 5 is a schematic diagram of updating a frequency domain position of an SRS in a current time domain position to a frequency domain position corresponding to a next time domain position at which the SRS is transmitted according to an embodiment of the present disclosure.

In an exemplary embodiment, the rule agreed upon with the first communication node includes at least one of: the number of times that a periodic SRS or a semi-persistent SRS is repeatedly transmitted in a time domain or between slots is a ratio of a hopping bandwidth to a multiple-transmission bandwidth, wherein the multiple-transmission bandwidth is a product of a transmission bandwidth and the number of different transmission positions in a frequency domain; in a case where the SRS is located at a frequency domain position where SRS transmission is not available, or in a case where the frequency domain position of the SRS completely or partially overlaps with a frequency domain position of another signal, the frequency domain position of the SRS in a current time domain position is updated to a frequency domain position corresponding to a previous time domain position at which the SRS is transmitted; in a case where the SRS is located at a frequency domain position where SRS transmission is not available, or in a case where the frequency domain position of the SRS completely or partially overlaps with a frequency domain position of another signal, the frequency domain position of the SRS in a current time domain position is updated to a frequency domain position corresponding to a next time domain position at which the SRS is transmitted; in a case where the SRS is located at a frequency domain position where SRS transmission is not available, or in a case where the frequency domain position of the SRS completely or partially overlaps with a frequency domain position of another signal, an SRS transmission number is not accumulated; in a case where the SRS is located at a frequency domain position where SRS transmission is not available, or in a case where the frequency domain position of the SRS completely or partially overlaps with a frequency domain position of another signal, N is added to an SRS transmission number, wherein N is an integer greater than or equal to 2 and less than or equal to 10; in a case where the SRS is an aperiodic SRS, an SRS transmission number $n_{SRS}$ is calculated as: $n_{SRS} = \lfloor \lfloor l'/R \rfloor / R_{partial} \rfloor$, wherein l' is an Orthogonal Frequency Division Multiplexing (OFDM) symbol serial number in an SRS resource, R is a repetition factor configured by the first communication node through a higher-layer parameter, and $R_{partial}$ is a factor configured by the first communication node through a higher-layer parameter and used for indicating repetition between SRS resources or SRS resource sets; in a case where the SRS is a periodic SRS or a semi-persistent SRS, an SRS transmission number is calculated as:

$$n_{SRS} = \left\lfloor \left( \left( \frac{N_{slot}^{frame,\mu} n_f + n_{s,f}^{\mu} - T_{offset}}{T_{SRS}} \right) \cdot \left( \frac{N_{symb}^{SRS}}{R} \right) + \left\lfloor \frac{l'}{R} \right\rfloor \right) / R_{partial} \right\rfloor,$$

wherein l' is an OFDM symbol serial number in an SRS resource, R is a repetition factor configured by the first communication node through a higher-layer parameter, $R_{partial}$ is a factor configured by the first communication node through a higher-layer parameter and used for indicating repetition between SRS resources or SRS resource sets or SRS transmission slots, $$N_{symb}^{SRS}$$

is consecutive OFDM symbols occupied by the SRS resource, $$N_{slot}^{frame,\mu}$$

is the number of slots per frame in a case where a sub-carrier interval is configured as $\mu$, $n_f$ is a system frame serial number, $$n_{s,f}^{\mu}$$

is an intra-frame slot serial number in a case where a sub-carrier interval is configured as $\mu$, $T_{SRS}$ is a slot period of the SRS, and $T_{offset}$ is a slot offset of the SRS; the transmission comb offset of the SRS is obtained based on at least one of following parameters: a symbol or slot index, a frequency domain subband or frequency band index, a cell Identity Document (ID) or UE ID, and the SRS transmission number $n_{SRS}$. In the present embodiment, in a case where the SRS is located at a frequency domain position where SRS transmission is not available, for example, in a case where the current time domain position is occupied, the frequency domain position of the SRS in the current time domain position may be updated to a frequency domain position corresponding to a previous time domain position at which the SRS is transmitted, or the frequency domain position of the SRS in the current time domain position may be updated to a frequency domain position corresponding to a next time domain position at which the SRS is transmitted, thereby avoiding interference with adjacent cells. For a schematic diagram of updating a frequency domain position of an SRS in a current time domain position to a frequency domain position corresponding to a previous time domain position at which the SRS is transmitted, reference can be made to FIG. 4. As shown in FIG. 4, region a in FIG. 4 is used to illustrate that a conventional UE transmits the SRS on subbands 1-4, and region b in FIG. 4 is used to illustrate that the UE does not transmit the SRS on subband 3, but repeatedly transmits the SRS on subband 1 in the embodiment of the present disclosure, and in this case, the SRS transmission number is accumulated and counted in a rule of 0, 0, 2, 3, . . . . For a schematic diagram of updating a frequency domain position of an SRS in a current time domain position to a frequency domain position corresponding to a next time domain position at which the SRS is transmitted, reference can be made to FIG. 5. As shown in FIG. 5, region a in FIG. 5 is used to illustrate that a conventional UE transmits the SRS on subbands 1-4, and region b in FIG. 5 is used to illustrate that the UE does not transmit the SRS on subband 3, but repeatedly transmits the SRS on subband 2 in the embodiment of the present disclosure, and in this case, the SRS transmission number is accumulated and counted based on a rule of 0, 2, 2, 3, . . . .

Figure 6:
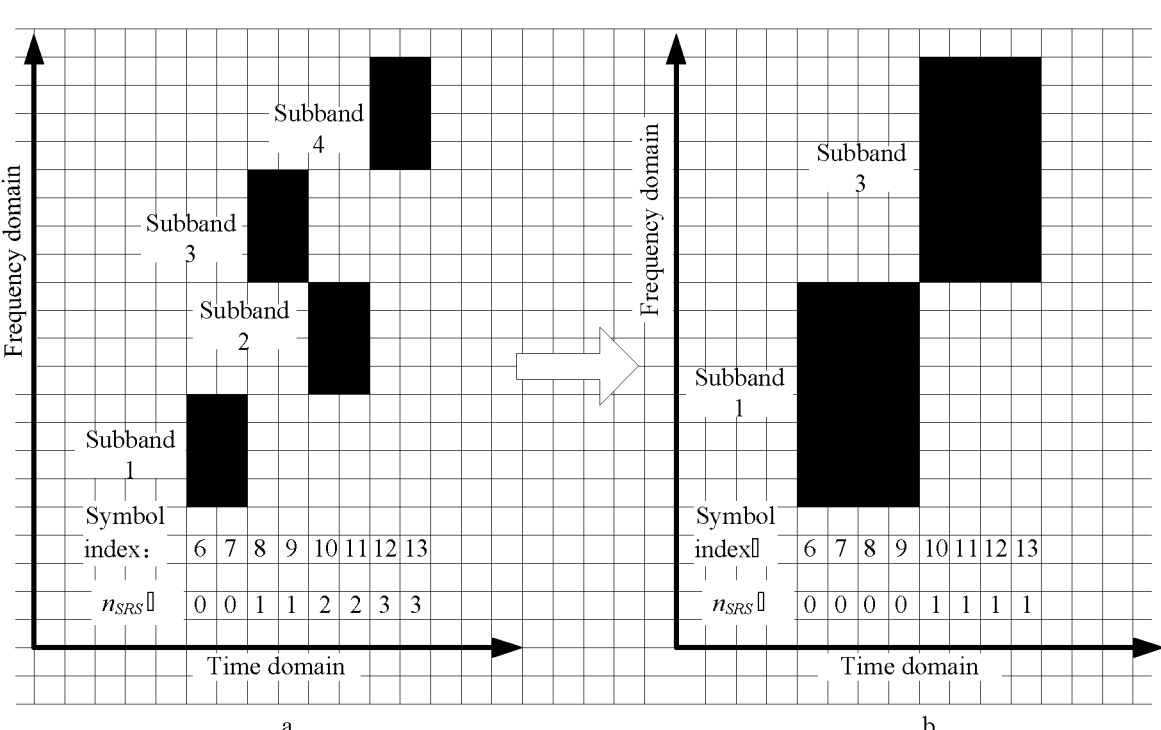
FIG. 6 is a frame hopping pattern that can be implemented in accordance with existing standard protocols.
Figure 7:
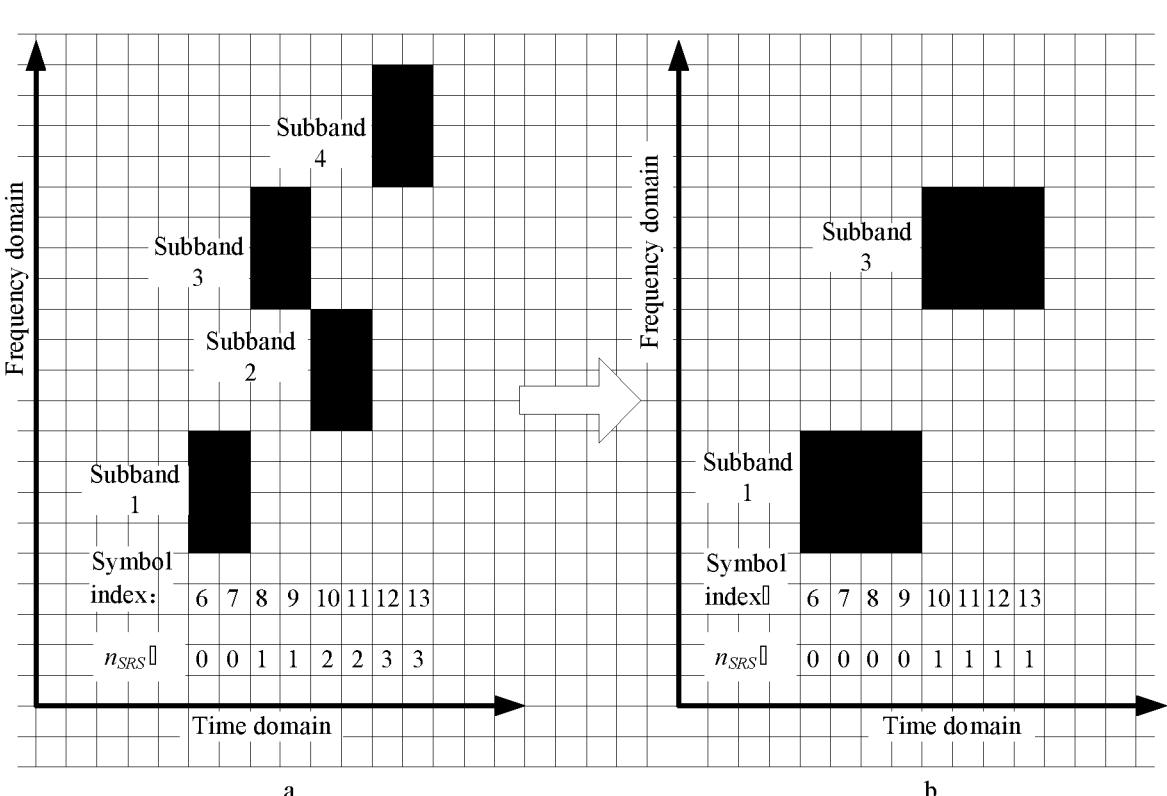
FIG. 7 is a frame hopping pattern that can be implemented by transmitting the SRS through only a part of subbands after partial frequency hopping within an aperiodic SRS resource is introduced according to an embodiment of the present disclosure.

In the present embodiment, in a case where the SRS is an aperiodic SRS, the coverage of the SRS can be enhanced by introducing partial frequency hopping in an aperiodic SRS resource (aperiodic SRS configuration). Assuming that all symbols in slot can be used for SRS transmission, it is supported that each SRS resource (SRS configuration) contains 8 symbols, and the repetition factor R=2. If R=4 is configured, the frequency domain needs to be occupied according to the existing standard protocol, then in order to fulfill the hopping bandwidth of the RRC configuration within the resource through hopping, only the frequency hopping pattern as shown in region b in FIG. 6 can be implemented. After partial frequency hopping in the aperiodic SRS resource is introduced, the SRS can be transmitted on only a part of subbands, and the frequency hopping pattern as shown in region b in FIG. 7 can be implemented. It can be seen by comparing the region b in FIG. 7 with the region b in FIG. 6 that the frequency domain bandwidth of the region b in FIG. 7 is half of the frequency domain bandwidth of the region b in FIG. 6, and in a case where the transmission power is the same, the smaller the frequency domain bandwidth, the larger the transmission energy and the larger the coverage area.

In an embodiment, the transmission comb offset of the SRS may be obtained based on the SRS transmission number $n_{SRS}$ and the transmission comb offset $$k_{TC}^{(p_i)}$$

of the SRS transmitted on a $p_i$ th antenna port is:

$$k_{TC}^{(p_i)} = \begin{cases} (\bar{k}_{TC} + n_{SRS} & \text{if } n_{SRS}^{cs} \in \{n_{SRS}^{cs,max}/2, \ldots, n_{SRS}^{cs,max} - 1\} \text{ and} \\ + K_{TC}/2) \bmod K_{TC} & N_{ap}^{SRS} = 4 \text{ and } p_i \in \{1001, 1003\} \\ (\bar{k}_{TC} + n_{SRS}) & \\ \bmod K_{TC} & \text{otherwise} \end{cases},$$

wherein $\bar{k}_{TC}$ is the transmission comb offset of the SRS configured by the first communication node through a higher-layer parameter, $n_{SRS}$ is the SRS transmission number, $K_{TC}$ is the number of transmission combs, $$n_{SRS}^{cs}$$

is a cyclic shift of an SRS sequence, $$n_{SRS}^{cs,max}$$

is a maximum number of the cyclic shift of the SRS sequence, and $$N_{ap}^{SRS}$$

is the number of antenna ports of the SRS. In the present embodiment, for Rel-17 SRS enhancement, with the increase of the number of the transmission combs of the SRS, the SRS transmission power will be further increased, and if there is no coordination of SRS-related information among cells, large inter-cell interference will be caused. Therefore, it is proposed that the comb offset of the SRS changes as frequency hopping is performed within the aperiodic SRS resource, so as to achieve the object of interference randomization. That is, since the carrier for transmitting the SRS changes with the change of the transmission comb offset, the transmission comb offset associated with the transmission manner may be determined first, the carrier for transmitting the SRS is determined based on the transmission comb offset, and the SRS is transmitted on the carrier. The comb offset may be randomly associated with a symbol/slot index, or an index of a frequency domain subband or frequency band, a cell ID (Identity Document) or a UE ID.

An SRS transmission method is provided in the present embodiment. FIG. 8 is a second flowchart of an SRS transmission method according to an embodiment of the present disclosure. As shown in FIG. 8, the method includes the following operation.

At S802, configuration information is sent to a second communication node via signaling, and an SRS transmitted by the second communication node based on the configuration information is received; or an SRS transmitted by a second communication node according to a rule agreed upon with the second communication node is received.

In the foregoing embodiment, the transmitted SRS may be a partial frequency hopping SRS. The partial frequency hopping SRS can accelerate a speed at which the base station obtains the channel information, and can also avoid services of other users in a frequency domain, thereby reducing interference to other users. In addition, partial frequency hopping with repetition can be used to enhance the coverage of the SRS.

The execution entity of the described operations may be a first communication node, for example, the first communication node may be a base station of a macro cell, a base station or a transmission node of a small cell, a sending node in a high-frequency communication system, a sending node in an Internet of Things system, a satellite node, etc. The second communication node may be a UE, including but not limited to a mobile phone, a portable device, or the like, and may also be a node in a communication system such as a vehicle-mounted terminal and a satellite node.

By means of the embodiment of the present disclosure, an SRS is transmitted based on configuration information sent via signaling, or the SRS is transmitted according to a rule agreed upon, so that the coverage range and the multiplexing capacity of the SRS can be enhanced. In this way, the problems in the related art that the coverage range and the multiplexing capacity of the SRS are small and interference is caused to adjacent cells can be solved, thereby achieving the effects of enhancing the coverage range and the multiplexing capacity of the SRS and reducing interference to the adjacent cells.

In the embodiment, the signaling includes at least one of: information for indicating the number of times that a periodic SRS or a semi-persistent SRS is repeatedly transmitted in a time domain or between slots; information for indicating the number of times that an SRS resource set is repeatedly transmitted in a time domain or between slots; information for indicating a full-hop bandwidth within which an aperiodic SRS is not detected; information for indicating to transmit the SRS at a frequency domain position the same as a frequency domain position in a previous time domain transmission unit; information for indicating to transmit the SRS at a frequency domain position the same as a frequency domain position in a next time domain transmission unit; and information for indicating hopping or randomization of a transmission comb of the SRS among SRS resources. In the present embodiment, in a case where the SRS to be transmitted is a partial frequency hopping SRS and the information, included in the signaling, for indicating the number of times that the periodic SRS or the semi-persistent SRS is repeatedly transmitted in the time domain or between the slots is equal to 2, a schematic diagram of repeatedly transmitting the SRS by using respective subbands in a plurality of subbands may refer to FIG. 3. As shown in FIG. 3, region a in FIG. 3 is used to illustrate that frequency hopping is performed for subband 1 to subband 4 in a frequency domain, so that as shown in region b in FIG. 3, the SRS is repeatedly transmitted twice on subband 1, the SRS is repeatedly transmitted twice on subband 3, and $n_{SRS}$ (the SRS transmission number) is accumulated and counted according to a rule of 0, 0, 1, 1, . . . .

In an embodiment, the rule agreed upon with the second communication node includes at least one of: the number of times that a periodic SRS or a semi-persistent SRS is repeatedly transmitted in a time domain or between slots is a ratio of a hopping bandwidth to a multiple-transmission bandwidth, wherein the multiple-transmission bandwidth are a product of a transmission bandwidth and the number of different transmission positions in a frequency domain; in a case where the SRS is located at a frequency domain position where SRS transmission is not available, or in a case where the frequency domain position of the SRS completely or partially overlaps with a frequency domain position of another signal, the frequency domain position of the SRS in a current time domain position is updated to a frequency domain position corresponding to a previous time domain position at which the SRS is transmitted; in a case where the SRS is located at a frequency domain position where SRS transmission is not available, or in a case where the frequency domain position of the SRS completely or partially overlaps with a frequency domain position of another signal, the frequency domain position of the SRS in a current time domain position is updated to a frequency domain position corresponding to a next time domain position at which the SRS is transmitted; in a case where the SRS is located at a frequency domain position where SRS transmission is not available, or in a case where the frequency domain position of the SRS completely or partially overlaps with a frequency domain position of another signal, an SRS transmission number is not accumulated; in a case where the SRS is located at a frequency domain position where SRS transmission is not available, or in a case where the frequency domain position of the SRS completely or partially overlaps with a frequency domain position of another signal, N is added to an SRS transmission number, wherein N is an integer greater than or equal to 2 and less than or equal to 10; in a case where the SRS is an aperiodic SRS, an SRS transmission number $n_{SRS}$ is calculated as: $n_{SRS}=\lfloor\lfloor l'/R\rfloor/R_{partial}\rfloor$, wherein l' is an OFDM symbol serial number in an SRS resource, R is a repetition factor configured by the first communication node through a higher-layer parameter, and $R_{partial}$ is a factor configured by the first communication node through a higher-layer parameter and used for indicating repetition between SRS resources or SRS resource sets; in a case where the SRS is a periodic SRS or a semi-persistent SRS, an SRS transmission number $n_{SRS}$ is calculated as:

$$n_{SRS} = \left\lfloor\left(\left(\frac{N_{slot}^{frame,\mu}n_f + n_{s,f}^{\mu} - T_{offset}}{T_{SRS}}\right)\cdot\left(\frac{N_{symb}^{SRS}}{R}\right)+\left\lfloor\frac{l'}{R}\right\rfloor\right)/R_{partial}\right\rfloor,$$

wherein l' is an OFDM symbol serial number in an SRS resource, R is a repetition factor configured by the first communication node through a higher-layer parameter, $R_{partial}$ is a factor configured by the first communication node through a higher-layer parameter and used for indicating repetition between SRS resources or SRS resource sets or SRS transmission slots, $$N_{symb}^{SRS}$$

is consecutive OFDM symbols occupied by the SRS resource, $$N_{slot}^{frame,\mu}$$

is the number of slots per frame in a case where a sub-carrier interval is configured as $\mu$, $n_f$ is a system frame serial number, $$n_{s,f}^{\mu}$$

is an intra-frame slot serial number in a case where a sub-carrier interval is configured as $\mu$, $T_{SRS}$ is a slot period of the SRS, and $T_{offset}$ is a slot offset of the SRS; the transmission comb offset of the SRS is obtained based on at least one of following parameters: a symbol or slot index, a frequency domain subband or frequency band index, a cell Identity Document (ID) or UE ID, and the SRS transmission number $n_{SRS}$. In the present embodiment, in a case where the SRS is located at a frequency domain position where SRS transmission is not available, for example, in a case where the current time domain position is occupied, the frequency domain position of the SRS in the current time domain position may be updated to a frequency domain position corresponding to a previous time domain position at which the SRS is transmitted, or the frequency domain position of the SRS in the current time domain position may be updated to a frequency domain position corresponding to a next time domain position at which the SRS is transmitted, thereby avoiding interference with adjacent cells. For a schematic diagram of updating a frequency domain position of an SRS in a current time domain position to a frequency domain position corresponding to a previous time domain position at which the SRS is transmitted, reference can be made to FIG. 4. As shown in FIG. 4, region a in FIG. 4 is used to illustrate that a conventional UE transmits the SRS on subbands 1-4, and region b in FIG. 4 is used to illustrate that the UE does not transmit the SRS on subband 3, but repeatedly transmits the SRS on subband 1 in the embodiment of the present disclosure, and in this case, the SRS transmission number is accumulated and counted in a rule of 0, 0, 2, 3, . . . . For a schematic diagram of updating a frequency domain position of an SRS in a current time domain position to a frequency domain position corresponding to a next time domain position at which the SRS is transmitted, reference can be made to FIG. 5. As shown in FIG. 5, region a in FIG. 5 is used to illustrate that a conventional UE transmits the SRS on subbands 1-4, and region b in FIG. 5 is used to illustrate that the UE does not transmit the SRS on subband 3, but repeatedly transmits the SRS on subband 2 in the embodiment of the present disclosure, and in this case, the SRS transmission number is accumulated and counted based on a rule of 0, 2, 2, 3, . . . .

In the present embodiment, in a case where the SRS is an aperiodic SRS, the coverage of the SRS can be enhanced by introducing partial frequency hopping in an aperiodic SRS resource (aperiodic SRS configuration). Assuming that all symbols in slot can be used for SRS transmission, it is supported that each SRS resource (SRS configuration) contains 8 symbols, and the repetition factor R=2. If R=4 is configured, the frequency domain needs to be occupied according to the existing standard protocol, then in order to fulfill the hopping bandwidth of the RRC configuration within the resource through hopping, only the frequency hopping pattern as shown in region b in FIG. 6 can be implemented. After partial frequency hopping in the aperiodic SRS resource is introduced, the SRS can be transmitted on only a part of subbands, and the frequency hopping pattern as shown in region b in FIG. 7 can be implemented. It can be seen by comparing the region b in FIG. 7 with the region b in FIG. 6 that the frequency domain bandwidth of the region b in FIG. 7 is half of the frequency domain bandwidth of the region b in FIG. 6, and in a case where the transmission power is the same, the smaller the frequency domain bandwidth, the larger the transmission energy and the larger the coverage area.

In an exemplary embodiment, the transmission comb offset of the SRS may be obtained based on the SRS transmission number $n_{SRS}$, and the transmission comb offset $$k_{TC}^{(p_i)}$$

of the SRS transmitted on a $p_i$ th antenna port is:

$$k_{TC}^{(p_i)} =
\begin{cases}
(\overline{k}_{TC} + n_{SRS} & \text{if } n_{SRS}^{cs} \in \{n_{SRS}^{cs,max}/2, \ldots, n_{SRS}^{cs,max} - 1\} \text{ and} \\
+K_{TC}/2)\text{mod}K_{TC} & N_{ap}^{SRS} = 4 \text{ and } p_i \in \{1001, 1003\} \\
(\overline{k}_{TC} + n_{SRS}) & \\
\quad \text{mod}K_{TC} & \text{otherwise}
\end{cases}$$

wherein $\overline{k}_{TC}$ is the transmission comb offset of the SRS configured by the first communication node through a higher-layer parameter, $n_{SRS}$ is the SRS transmission number, $K_{TC}$ is the number of transmission combs, $$n_{SRS}^{cs}$$

is a cyclic shift of an SRS sequence, $$n_{SRS}^{cs,max}$$

is a maximum number of the cyclic shift of the SRS sequence, and $$N_{ap}^{SRS}$$

is the number of antenna ports of the SRS. In the present embodiment, for Rel-17 SRS enhancement, with the increase of the number of the transmission combs of the SRS, the SRS transmission power will be further increased, and if there is no coordination of SRS-related information among cells, large inter-cell interference will be caused. Therefore, it is proposed that the comb offset of the SRS changes as frequency hopping is performed within the aperiodic SRS resource, so as to achieve the object of interference randomization. That is, since the carrier for transmitting the SRS changes with the change of the transmission comb offset, the transmission comb offset associated with the transmission manner may be determined first, the carrier for transmitting the SRS is determined based on the transmission comb offset, and the SRS is transmitted on the carrier. The comb offset may be randomly associated with a symbol/slot index, or an index of a frequency domain subband or frequency band, a cell ID (Identity Document) or a UE ID.

In the foregoing embodiments, the SRS transmission number in a case of frequency domain hopping of the SRS is calculated, and the SRS is repeatedly transmitted in a certain frequency band by reducing the bandwidth for transmitting the SRS, so as to enhance the coverage and multiplexing capacity of the SRS and reduce the interference on adjacent cells. In a case where the SRS encounters a frequency domain subband that is not transmitted, the SRS is repeatedly transmitted at this time-domain position on the former frequency domain subband, or the latter frequency domain subband, thereby solving the problem that frequency hopping of the SRS and data of other users or other services conflict with each other.

Through the description of the foregoing embodiments, a person having ordinary skill in the art can clearly understand that the method according to the foregoing embodiments may be implemented by software in addition to a necessary universal hardware platform, and definitely may also be implemented by hardware. However, in many cases, the former is a preferred implementation. Based on such understanding, the essence of the technical solutions of the present disclosure or the part contributing to the prior art may be embodied in the form of a software product. The computer software product is stored in a storage medium (such as a ROM/RAM, a magnetic disk, or an optical disk), and includes several instructions for instructing a terminal device (which may be a mobile phone, a computer, a server, or a network device) to execute the methods described in the embodiments of the present disclosure.

An SRS transmission device is provided in the present embodiment, which is used for realizing the described embodiments and exemplary implementations, and what has been described will not be elaborated. The term "module", as used hereinafter, is a combination of software and/or hardware capable of realizing a predetermined function. Although the device described in the following embodiment is preferably implemented by software, implementation of hardware or a combination of software and hardware is also possible and conceived.

FIG. 9 is a first structure diagram of an SRS transmission device according to an embodiment of the present disclosure, and as shown in FIG. 9, the device includes:

a first transmission module 92, configured to receive configuration information sent by a first communication node via signaling, and transmit an SRS to the first communication node based on the configuration information; or transmit an SRS to a first communication node according to a rule agreed upon with the first communication node.

In an exemplary embodiment, the signaling includes at least one of: information for indicating the number of times that a periodic SRS or a semi-persistent SRS is repeatedly transmitted in a time domain or between slots; information for indicating the number of times that an SRS resource set is repeatedly transmitted in a time domain or between slots; information for indicating a full-hop bandwidth within which an aperiodic SRS is not detected; information for indicating to transmit the SRS at a frequency domain position the same as a frequency domain position in a previous time domain transmission unit; information for indicating to transmit the SRS at a frequency domain position the same as a frequency domain position in a next time domain transmission unit; and information for indicating hopping or randomization of a transmission comb of the SRS among SRS resources.

In an exemplary embodiment, the rule agreed upon with the first communication node includes at least one of: the number of times that a periodic SRS or a semi-persistent SRS is repeatedly transmitted in a time domain or between slots is a ratio of a hopping bandwidth to a multiple-transmission bandwidth, wherein the multiple-transmission bandwidth is a product of a transmission bandwidth and the number of different transmission positions in a frequency domain; in a case where the SRS is located at a frequency domain position where SRS transmission is not available, or in a case where the frequency domain position of the SRS completely or partially overlaps with a frequency domain position of another signal, the frequency domain position of the SRS in a current time domain position is updated to a frequency domain position corresponding to a previous time domain position at which the SRS is transmitted; in a case where the SRS is located at a frequency domain position where SRS transmission is not available, or in a case where the frequency domain position of the SRS completely or partially overlaps with a frequency domain position of another signal, the frequency domain position of the SRS in a current time domain position is updated to a frequency domain position corresponding to a next time domain position at which the SRS is transmitted; in a case where the SRS is located at a frequency domain position where SRS transmission is not available, or in a case where the frequency domain position of the SRS completely or partially overlaps with a frequency domain position of another signal, an SRS transmission number is not accumulated; in a case where the SRS is located at a frequency domain position where SRS transmission is not available, or in a case where the frequency domain position of the SRS completely or partially overlaps with a frequency domain position of another signal, N is added to an SRS transmission number, wherein N is an integer greater than or equal to 2 and less than or equal to 10; in a case where the SRS is an aperiodic SRS, an SRS transmission number $n_{SRS}$ is calculated as: $n_{SRS} = \lfloor \lfloor l'/R \rfloor / R_{partial} \rfloor$, wherein l' is an OFDM symbol serial number in an SRS resource, R is a repetition factor configured by the first communication node through a higher-layer parameter, and $R_{partial}$ is a factor configured by the first communication node through a higher-layer parameter and used for indicating repetition between SRS resources or SRS resource sets; in a case where the SRS is a periodic SRS or a semi-persistent SRS, an SRS transmission number $n_{SRS}$ is calculated as:

$$n_{SRS} = \left\lfloor \left( \left( \frac{N_{slot}^{frame,\mu} n_f + n_{s,f}^{\mu} - T_{offset}}{T_{SRS}} \right) \cdot \left( \frac{N_{symb}^{SRS}}{R} \right) + \left\lfloor \frac{l'}{R} \right\rfloor \right) / R_{partial} \right\rfloor$$

wherein l' is an OFDM symbol serial number in an SRS resource, R is a repetition factor configured by the first communication node through a higher-layer parameter, $R_{partial}$ is a factor configured by the first communication node through a higher-layer parameter and used for indicating repetition between SRS resources or SRS resource sets or SRS transmission slots, $$N_{symb}^{SRS}$$

is consecutive OFDM symbols occupied by the SRS resource, $$N_{slot}^{frame,\mu}$$

is the number of slots per frame in a case where a sub-carrier interval is configured as $\mu$, $n_f$ is a system frame serial number, $$n_{s,f}^{\mu}$$

is an intra-frame slot serial number in a case where a sub-carrier interval is configured as $\mu$, $T_{SRS}$ is a slot period of the SRS, and $T_{offset}$ is a slot offset of the SRS; and the transmission comb offset of the SRS is obtained based on at least one of following parameters: a symbol or slot index, a frequency domain subband or frequency band index, a cell Identity Document (ID) or UE ID, and the SRS transmission number $n_{SRS}$.

In an exemplary embodiment, the transmission comb offset of the SRS may be obtained based on the SRS transmission number $n_{SRS}$ and the transmission comb offset $$k_{TC}^{(p_i)}$$

of the SRS transmitted on a $p_i$ th antenna port is:

$$k_{TC}^{(p_i)} = \begin{cases} (\overline{k}_{TC} + n_{SRS} & \text{if } n_{SRS}^{cs} \in \{n_{SRS}^{cs,max}/2, \dots, n_{SRS}^{cs,max} - 1\} \text{ and} \\ +K_{TC}/2)\mathrm{mod}K_{TC} & N_{ap}^{SRS} = 4 \text{ and } p_i \in \{1001, 1003\} \\ (\overline{k}_{TC} + n_{SRS}) & \\ \quad \mathrm{mod}K_{TC} & \text{otherwise} \end{cases}$$

wherein $\overline{k}_{TC}$ is the transmission comb offset of the SRS configured by the first communication node through a higher-layer parameter, $n_{SRS}$ is the SRS transmission number, $K_{TC}$ is the number of transmission combs, $$n_{SRS}^{cs}$$

is a cyclic shift of an SRS sequence, $$n_{SRS}^{cs,max}$$

is a maximum number of the cyclic shift of the SRS sequence, and $$N_{ap}^{SRS}$$

is the number of antenna ports of the SRS.

FIG. 10 is a second structure diagram of an SRS transmission device according to an embodiment of the present disclosure, and as shown in FIG. 10, the device includes:

a second transmission module 1002, configured to send configuration information to a second communication node via signaling, and receive an SRS transmitted by the second communication node based on the configuration information; or receive an SRS transmitted by a second communication node according to a rule agreed upon with the second communication node.

In an exemplary embodiment, the signaling includes at least one of: information for indicating the number of times that a periodic SRS or a semi-persistent SRS is repeatedly transmitted in a time domain or between slots; information for indicating the number of times that an SRS resource set is repeatedly transmitted in a time domain or between slots; information for indicating a full-hop bandwidth within which an aperiodic SRS is not detected; information for indicating to transmit the SRS at a frequency domain position the same as a frequency domain position in a previous time domain transmission unit; information for indicating to transmit the SRS at a frequency domain position the same as a frequency domain position in a next time domain transmission unit; and information for indicating hopping or randomization of a transmission comb of the SRS among SRS resources.

In an exemplary embodiment, the rule agreed upon with the second communication node includes at least one of: the number of times that a periodic SRS or a semi-persistent SRS is repeatedly transmitted in a time domain or between slots is a ratio of a hopping bandwidth to a multiple-transmission bandwidth, wherein the multiple-transmission bandwidth are a product of a transmission bandwidth and the number of different transmission positions in a frequency domain; in a case where the SRS is located at a frequency domain position where SRS transmission is not available, or in a case where the frequency domain position of the SRS completely or partially overlaps with a frequency domain position of another signal, the frequency domain position of the SRS in a current time domain position is updated to a frequency domain position corresponding to a previous time domain position at which the SRS is transmitted; in a case where the SRS is located at a frequency domain position where SRS transmission is not available, or in a case where the frequency domain position of the SRS completely or partially overlaps with a frequency domain position of another signal, the frequency domain position of the SRS in a current time domain position is updated to a frequency domain position corresponding to a next time domain position at which the SRS is transmitted; in a case where the SRS is located at a frequency domain position where SRS transmission is not available, or in a case where the frequency domain position of the SRS completely or partially overlaps with a frequency domain position of another signal, the SRS transmission number is not accumulated; in a case where the SRS is located at a frequency domain position where SRS transmission is not available, or in a case where the frequency domain position of the SRS completely or partially overlaps with a frequency domain position of another signal, N is added to an SRS transmission number, wherein N is an integer greater than or equal to 2 and less than or equal to 10; in a case where the SRS is an aperiodic SRS, the calculation method for the SRS transmission number $n_{SRS}$ is $n_{SRS}=\lfloor\lfloor l'/R\rfloor/R_{partial}\rfloor$, wherein is an OFDM symbol serial number within an SRS resource, R is a repetition factor configured by the first communication node through a higher-layer parameter, $R_{partial}$ is a factor configured by the first communication node through a higher-layer parameter and used for indicating repetition between SRS resources or SRS resource sets; in a case where the SRS is a periodic SRS or a semi-persistent SRS, an SRS transmission number $n_{SRS}$ is calculated as:

$$n_{SRS}=\left\lfloor\left(\left(\frac{N_{slot}^{frame,\mu}n_f+n_{s,f}^{\mu}-T_{offset}}{T_{SRS}}\right)\cdot\left(\frac{N_{symb}^{SRS}}{R}\right)+\left\lfloor\frac{l'}{R}\right\rfloor\right)/R_{partial}\right\rfloor,$$

wherein l' is an OFDM symbol serial number in an SRS resource, R is a repetition factor configured by the first communication node through a higher-layer parameter, $R_{partial}$ is a factor configured by the first communication node through a higher-layer parameter and used for indicating repetition between SRS resources or SRS resource sets or SRS transmission slots, $$N_{symb}^{SRS}$$

is consecutive OFDM symbols occupied by the SRS resource, $$N_{slot}^{frame,\mu}$$

is the number of slots per frame in a case where a sub-carrier interval is configured as μ, $n_f$ is a system frame serial number, $$n_{s,f}^{\mu}$$

is an intra-frame slot serial number in a case where a sub-carrier interval is configured as μ, $T_{SRS}$ is a slot period of the SRS, and $T_{offset}$ is a slot offset of the SRS; and the transmission comb offset of the SRS is obtained based on at least one of following parameters: a symbol or slot index, a frequency domain subband or frequency band index, a cell Identity Document (ID) or UE ID, and the SRS transmission number $n_{SRS}$.

In an exemplary embodiment, the transmission comb offset of the SRS is obtained based on the SRS transmission number $n_{SRS}$, and the transmission comb offset $p_i$ of the SRS transmitted on a $$k_{TC}^{(p_i)}$$

th antenna port is:

$$k_{TC}^{(p_i)}=$$

-continued $$\begin{cases}(\overline{k}_{TC}+n_{SRS} & \text{if } n_{SRS}^{cs}\in\{n_{SRS}^{cs,max}/2,\ \ldots\ ,n_{SRS}^{cs,max}-1\}\text{ and} \\ +K_{TC}/2)\text{mod}K_{TC} & N_{ap}^{SRS}=4\text{ and }p_i\in\{1001,1003\} \\ (\overline{k}_{TC}+n_{SRS}) & \\ \text{mod}K_{TC} & \text{otherwise}\end{cases},$$

wherein $\overline{k}_{TC}$ is the transmission comb offset of the SRS configured by the first communication node through a higher-layer parameter, $n_{SRS}$ is the SRS transmission number, $K_{TC}$ is the number of transmission combs, $$n_{SRS}^{cs}$$

is a cyclic shift of an SRS sequence, $$n_{SRS}^{cs,max}$$

is a maximum number of the cyclic shift of the SRS sequence, and $$N_{ap}^{SRS}$$

is the number of antenna ports of the SRS.

According to an embodiment of the present disclosure, an SRS transmission system is provided, including: a first communication node and a second communication node, wherein the first communication node includes the first SRS transmission device described in the described embodiment, and the second communication node includes the second SRS transmission device described in the described embodiment.

It should be noted that each module may be implemented by software or hardware. The latter may be implemented in the following manner, but is not limited thereto: all the modules are located in a same processor; or the modules are located in different processors in an arbitrary combination.

An embodiment of the present disclosure provides a computer-readable storage medium. The computer-readable storage medium stores a computer program, wherein the computer program is configured to execute the operations in any one of the described method embodiments at runtime.

In the present embodiment, the computer-readable storage medium may be configured to store a computer program for executing the operation of:

S1, receiving configuration information sent by a first communication node via signaling, and transmitting the SRS to the first communication node based on the configuration information; or transmitting an SRS to a first communication node according to a rule agreed upon with the first communication node.

The computer-readable storage medium is further configured to store a computer program for performing the operations of:

S1, sending configuration information to a second communication node via signaling, and receiving an SRS transmitted by the second communication node based on the configuration information; or receiving an SRS transmitted by a second communication node according to a rule agreed upon with the second communication node.

In the present embodiment, the computer-readable storage medium may include, but is not limited to, any medium that can store a computer program, such as a USB flash disk, a Read-Only Memory (ROM), a Random Access Memory (RAM), a mobile hard disk, a magnetic disk, or an optical disk.

An embodiment of the present disclosure provides an electronic device, including a memory and a processor. The memory stores a computer program. The processor is configured to run the computer program to execute operations in any one of the method embodiments.

The electronic device may further include a transmitting device and an input/output device, wherein the transmitting device is connected to the processor, and the input/output device is connected to the processor.

In the present embodiment, the processor may be configured to execute the following operations by means of a computer program:

S1, receiving configuration information sent by a first communication node via signaling, and transmitting the SRS to the first communication node based on the configuration information; or transmitting an SRS to a first communication node according to a rule agreed upon with the first communication node.

In the present embodiment, the processor may be configured to execute the following operations by means of a computer program:

S1, sending configuration information to a second communication node via signaling, and receiving an SRS transmitted by the second communication node based on the configuration information; or receiving an SRS transmitted by a second communication node according to a rule agreed upon with the second communication node.

For specific examples in the present embodiment, reference may be made to the examples described in the foregoing embodiments and exemplary embodiments, and details are not repeatedly described in the present embodiment.

Obviously, a person having ordinary skill in the art should understand that each module or each operation of the present disclosure may be implemented by a universal computing device, and the modules or operations may be concentrated on a single computing device or distributed on a network formed by a plurality of computing devices, and may be implemented by program codes executable for the computing devices, so that the modules or operations may be stored in a storage device for execution with the computing devices. The shown or described operations may be executed in sequences different from those described here in some cases, or may form each integrated circuit module respectively, or multiple modules or operations therein may form a single integrated circuit module for implementation. As such, the present disclosure is not limited to any particular hardware and software combination.

The foregoing descriptions are merely exemplary embodiments of the present disclosure, but are not intended to limit the present disclosure. For a person having ordinary skill in the art, the present disclosure may have various modifications and variations. Any modifications, equivalent replacements, improvements and the like made within the principle of the present disclosure shall belong to the scope of protection of the present disclosure.

What is claimed is:

1. A Sounding Reference Signal (SRS) transmission method, comprising:

transmitting an SRS to a first communication node according to a rule agreed upon with the first communication node;

wherein the rule agreed upon with the first communication node comprises at least one of:

in a case where the SRS is an aperiodic SRS, an SRS transmission number is $n_{SRS}$ calculated as: $n_{SRS}=\lfloor\lfloor l'/R\rfloor/R_{partial}\rfloor$, wherein l' is an Orthogonal Frequency Division Multiplexing (OFDM) symbol serial number in an SRS resource, R is a repetition factor configured by the first communication node through a higher-layer parameter, and $R_{partial}$ is a factor configured by the first communication node through a higher-layer parameter and used for indicating repetition between SRS resources or SRS resource sets;

in a case where the SRS is a periodic SRS or a semi-persistent SRS, an SRS transmission number $n_{SRS}$ is calculated as:

$$n_{SRS} = \left\lfloor \left( \left( \frac{N_{slot}^{frame,\mu} n_f + n_{s,f}^{\mu} - T_{offset}}{T_{SRS}} \right) \cdot \left( \frac{N_{symb}^{SRS}}{R} \right) + \left\lfloor \frac{l'}{R} \right\rfloor \right) \middle/ R_{partial} \right\rfloor$$

wherein l' is an OFDM symbol serial number in an SRS resource, R is a repetition factor configured by the first communication node through a higher-layer parameter, $R_{partial}$ is a factor configured by the first communication node through a higher-layer parameter and used for indicating repetition between SRS resources or SRS resource sets or SRS transmission slots, $$N_{symb}^{SRS}$$

is consecutive OFDM symbols occupied by the SRS resource, $$N_{slot}^{frame,\mu}$$

is the number of slots per frame in a case where a sub-carrier interval is configured as $\mu$, $n_f$ is a system frame serial number, $$n_{s,f}^{\mu}$$

is an intra-frame slot serial number in a case where the sub-carrier interval is configured as $\mu$, $T_{SRS}$ is a slot period of the SRS, and $T_{offset}$ is a slot offset of the SRS.

2. The method according to claim 1, wherein the rule agreed upon with the first communication node comprises:

a number of times that a periodic SRS or a semi-persistent SRS is repeatedly transmitted in a time domain or between slots is a ratio of a hopping bandwidth to a multiple-transmission bandwidth, wherein the multiple-transmission bandwidth is a product of a transmission bandwidth and the number of different transmission positions in a frequency domain.

3. The method according to claim 1, wherein a transmission comb offset of the SRS is obtained based on the SRS transmission number $n_{SRS}$, and the transmission comb offset $$k_{TC}^{(p_i)}$$

of the SRS transmitted on a $p_i$ th antenna port is:

$$k_{TC}^{(p_i)} = \begin{cases} (\bar{k}_{TC} + n_{SRS} + K_{TC}/2)\mathrm{mod}K_{TC} & \text{if } n_{SRS}^{cs} \in \{n_{SRS}^{cs,max}/2, \ldots, n_{SRS}^{cs,max} - 1\} \text{ and } N_{ap}^{SRS} = 4 \text{ and } p_i \in \{1001, 1003\} \\ (\bar{k}_{TC} + n_{SRS})\mathrm{mod}K_{TC} & \text{otherwise} \end{cases}$$

wherein $\bar{k}_{TC}$ is the transmission comb offset of the SRS configured by the first communication node through a higher-layer parameter, $n_{SRS}$ is the SRS transmission number, $K_{TC}$ is the number of transmission combs, $$n_{SRS}^{cs}$$

is a cycle shirt or an SKS sequence, $$n_{SRS}^{cs,max}$$

is a maximum number of the cyclic shift of the SRS sequence, and $$N_{ap}^{SRS}$$

is the number of antenna ports of the SRS;
wherein the SRS is the aperiodic SRS or the periodic SRS or the semi-persistent SRS.

4. A second communication node, comprising a memory storing instructions and a processor in communication with the memory, wherein the processor is configured to execute the instructions to execute the method according to claim 1.

5. A non-transitory computer-readable storage medium, the computer-readable storage medium storing a computer program, wherein the computer program is configured to execute the method according to claim 1.

6. The method according to claim 1, wherein the rule agreed upon with the first communication node comprises at least one of:

in a case where the SRS is located at a frequency domain position where SRS transmission is not available, or in a case where the frequency domain position of the SRS completely or partially overlaps with a frequency domain position of another signal, the frequency domain position of the SRS in a current time domain position is updated to a frequency domain position corresponding to a previous time domain position at which the SRS is transmitted, wherein the SRS is the aperiodic SRS or the periodic SRS or the semi-persistent SRS, and in a case where the SRS is located at a frequency domain position where SRS transmission is not available, or in a case where the frequency domain position of the SRS completely or partially overlaps with a frequency domain position of another signal, the frequency domain position of the SRS in a current time domain position is updated to a frequency domain position corresponding to a next time domain position at which the SRS is transmitted, wherein the SRS is the aperiodic SRS or the periodic SRS or the semi-persistent SRS.

7. The method according to claim 1, wherein the rule agreed upon with the first communication node comprises at least one of:

in a case where the SRS is located at a frequency domain position where SRS transmission is not available, or in a case where the frequency domain position of the SRS completely or partially overlaps with a frequency domain position of another signal, an SRS transmission number is not accumulated, wherein the SRS is the aperiodic SRS or the periodic SRS or the semi-persistent SRS; and in a case where the SRS is located at a frequency domain position where SRS transmission is not available, or in a case where the frequency domain position of the SRS completely or partially overlaps with a frequency domain position of another signal, N is added to an SRS transmission number, wherein N is an integer greater than or equal to 2 and less than or equal to 10, wherein the SRS is the aperiodic SRS or the periodic SRS or the semi-persistent SRS.

8. The method according to claim 1, wherein the rule agreed upon with the first communication node comprises:

a transmission comb offset of the SRS is obtained based on at least one of following parameters: a symbol or slot index, a frequency domain subband or frequency band index, a cell Identity Document (ID) or User Equipment (UE) ID, and the SRS transmission number $n_{SRS}$;

wherein the SRS is the aperiodic SRS or the periodic SRS or the semi-persistent SRS.

9. A Sounding Reference Signal (SRS) transmission method, comprising:

receiving an SRS transmitted by a second communication node according to a rule agreed upon with the second communication node;

wherein the rule agreed upon with the second communication node comprises at least one of:

in a case where the SRS is an aperiodic SRS, an SRS transmission number $n_{SRS}$ is calculated as: $n_{SRS} = \lfloor \lfloor l'/R \rfloor / R_{partial} \rfloor$, wherein l' is an Orthogonal Frequency Division Multiplexing (OFDM) symbol serial number in an SRS resource, R is a repetition factor configured by the first communication node through a higher-layer parameter, and $R_{partial}$ is a factor configured by the first communication node through a higher-layer parameter and used for indicating repetition between SRS resources or SRS resource sets;

in a case where the SRS is a periodic SRS or a semi-persistent SRS, an SRS transmission number $n_{SRS}$ is calculated as:

$$n_{SRS} = \left\lfloor \left( \left( \frac{N_{slot}^{frame,\mu} n_f + n_{s,f}^{\mu} - T_{offset}}{T_{SRS}} \right) \cdot \left( \frac{N_{symb}^{SRS}}{R} \right) + \left\lfloor \frac{l'}{R} \right\rfloor \right) / R_{partial} \right\rfloor$$

wherein l' is an OFDM symbol serial number in an SRS resource, R is a repetition factor configured by the first communication node through a higher-layer parameter, $R_{partial}$ is a factor configured by the first communication node through a higher-layer parameter and used for indicating repetition between SRS resources or SRS resource sets or SRS transmission slots, $$N_{symb}^{SRS}$$

is consecutive OFDM symbols occupied by the SRS resource, $$N_{slot}^{frame,\mu}$$

is the number of slots per frame in a case where a sub-carrier interval is configured as $\mu$, $n_f$ is a system frame serial number, $$n_{s,f}^{\mu}$$

is an intra-frame slot serial number in a case where the sub-carrier interval is configured as $\mu$, $T_{SRS}$ is a slot period of the SRS, and $T_{offset}$ is a slot offset of the SRS.

10. The method according to claim 9, wherein the rule agreed upon with the second communication node comprises at least one of:

a number of times that a periodic SRS or a semi-persistent SRS is repeatedly transmitted in a time domain or between slots is a ratio of a hopping bandwidth to a multiple-transmission bandwidth, wherein the multiple-transmission bandwidth is a product of a transmission bandwidth and the number of different transmission positions in a frequency domain;

in a case where the SRS is located at a frequency domain position where SRS transmission is not available, or in a case where the frequency domain position of the SRS completely or partially overlaps with a frequency domain position of another signal, the frequency domain position of the SRS in a current time domain position is updated to a frequency domain position corresponding to a previous time domain position at which the SRS is transmitted, wherein the SRS is the aperiodic SRS or the periodic SRS or the semi-persistent SRS;

in a case where the SRS is located at a frequency domain position where SRS transmission is not available, or in a case where the frequency domain position of the SRS completely or partially overlaps with a frequency domain position of another signal, the frequency domain position of the SRS in a current time domain position is updated to a frequency domain position corresponding to a next time domain position at which the SRS is transmitted, wherein the SRS is the aperiodic SRS or the periodic SRS or the semi-persistent SRS;

in a case where the SRS is located at a frequency domain position where SRS transmission is not available, or in a case where the frequency domain position of the SRS completely or partially overlaps with a frequency domain position of another signal, an SRS transmission number is not accumulated, wherein the SRS is the aperiodic SRS or the periodic SRS or the semi-persistent SRS;

in a case where the SRS is located at a frequency domain position where SRS transmission is not available, or in a case where the frequency domain position of the SRS completely or partially overlaps with a frequency domain position of another signal, N is added to an SRS transmission number, wherein N is an integer greater than or equal to 2 and less than or equal to 10, wherein the SRS is the aperiodic SRS or the periodic SRS or the semi-persistent SRS; and a transmission comb offset of the SRS is obtained based on at least one of following parameters: a symbol or slot index, a frequency domain subband or frequency band index, a cell Identity Document (ID) or User Equipment (UE) ID, and the SRS transmission number $n_{SRS}$, wherein the SRS is the aperiodic SRS or the periodic SRS or the semi-persistent SRS.

11. The method according to claim 9, wherein a transmission comb offset of the SRS is obtained based on the SRS transmission number $n_{SRS}$, and the transmission comb offset $$k_{TC}^{(p_i)}$$

of the SRS transmitted on a $p_i$ th antenna port is:

$$k_{TC}^{(p_i)} = \begin{cases} (\overline{k}_{TC} + n_{SRS} + K_{TC}/2)\bmod K_{TC} & \text{if } n_{SRS}^{cs} \in \{n_{SRS}^{cs,max}/2, \ldots, n_{SRS}^{cs,max} - 1\} \text{ and } N_{ap}^{SRS} = 4 \text{ and } p_i \in \{1001, 1003\} \\ (\overline{k}_{TC} + n_{SRS})\bmod K_{TC} & \text{otherwise} \end{cases}$$

wherein $\overline{k}_{TC}$ is the transmission comb offset of the SRS configured by a first communication node through a higher-layer parameter, $n_{SRS}$ is the SRS transmission number, $K_{TC}$ is the number of transmission combs, $$n_{SRS}^{cs}$$

is a cyclic shift of an SRS sequence, $$n_{SRS}^{cs,max}$$

is a maximum number of the cyclic shift of the SRS sequence, and $$N_{ap}^{SRS}$$

is the number of antenna ports of the SRS;
wherein the SRS is the aperiodic SRS or the periodic SRS or the semi-persistent SRS.

12. A first communication node, comprising a memory storing instructions and a processor in communication with the memory, wherein the processor is configured to execute the instructions to execute the method according to claim 9.

13. A non-transitory computer-readable storage medium, the computer-readable storage medium storing a computer program, wherein the computer program is configured to execute the method according to claim 9.

* * * * *